E. J. FENN.
Horse-Hay Fork.
No. 79,644. Patented July 7, 1868.
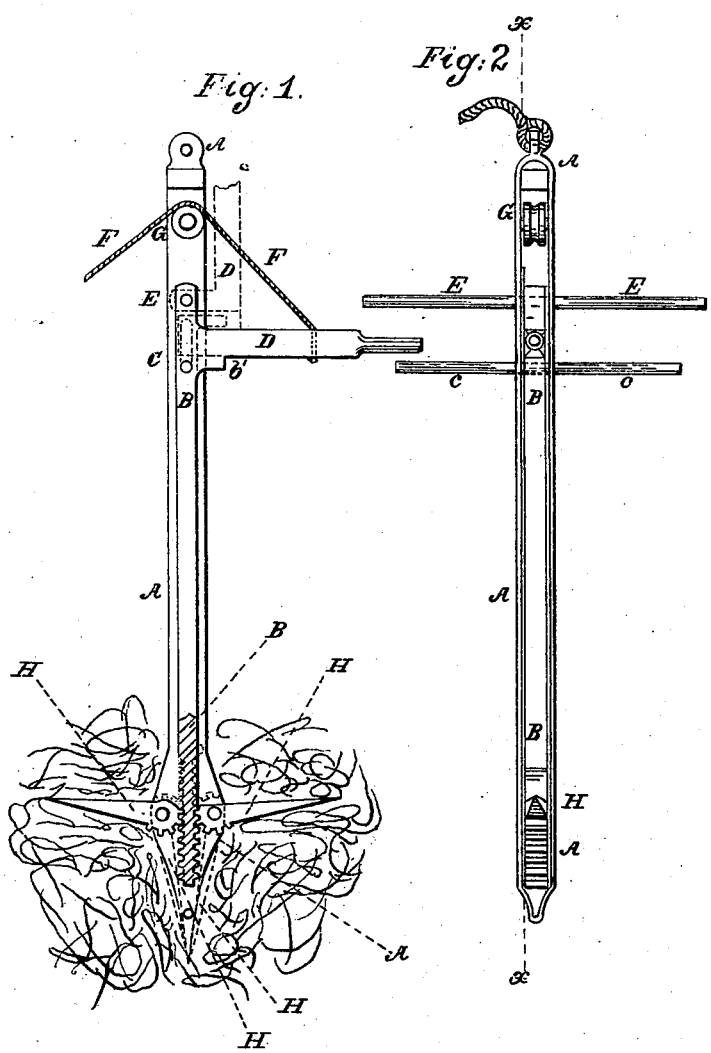

UNITED STATES PATENT OFFICE.

E. J. FENN, OF MEDINA, OHIO.

Letters Patent No. 79,644, dated July 7, 1868.

---

IMPROVEMENT IN HORSE HAY-FORKS.

---

*The Schedule referred to in these Letters Patent and making part of the same.*

---

TO ALL WHOM IT MAY CONCERN:

Be it known that I, E. J. FENN, of Medina, in the county of Medina, and State of Ohio, have invented a new and useful Improvement in Hay-Forks; and I do hereby declare that the following is a full, clear, and exact description thereof, which will enable others skilled in the art to make and use the same, reference being had to the accompanying drawings, forming part of this specification, in which—

Figure 1 is a longitudinal section of my improved hay-fork, taken through the line $x\ x$, fig. 2.

Figure 2 is an edge view of the same.

Similar letters of reference indicate corresponding parts.

My invention has for its object to furnish a simple, convenient, and effective fork for handling hay, with horse or other power, and which shall at the same time be easily operated to load and unload it.

It consists in the construction and combination of the various parts, as hereinafter more fully described.

A is the shank of the fork, consisting of two parallel bars welded or otherwise securely attached to each other at their upper and lower ends, or it may be made of a single bar slotted to receive the other parts.

In the upper end of the shank A is formed an eye for the attachment of the hoisting-rope.

The lower end of the shank A is made pointed, as shown in figs. 1 and 2.

B is a bar passing up vertically, and fitting between the bars of the shank A.

C is a pin, which passes through a slot in the upper part of the shank A, and through the upper part of the bar B, so that the said bar B may move up and down the length of the said slot.

The upper end of the bar B has a shoulder, $b'$, formed on its upper end for the lock-lever D to rest against, when pushing out the prongs, and holding the loaded fork locked.

The lock-lever D is made with two arms extending out at right angles from each other, and is pivoted between the bars of the shank A by the pin E, which passes through the said shank A, and through the end of the short arm of the said lever D, so that the said lever may act as a cam in forcing out the prongs of the fork.

The longer projecting arm of the lever D serves as a handle in operating it, and to it is attached the trip-cord F, which passes over a pulley, G, pivoted between the bars of the shank A, near their upper ends, and extends down into such a position that it can be conveniently reached and operated to trip the fork.

Upon the edges of the lower end of the bar B are formed cogs or teeth, as shown in figs. 1 and 2.

H are the prongs, which are pivoted between the bars of the shank A, upon opposite sides of the bar B, in such positions that the teeth formed upon their bases may mesh into the teeth formed upon the lower end of the bar B, so that, as the said bar B is drawn upward, the ends of the prongs H may be made to move downward into the position shown in red in fig. 1, thus forming a sharp point that may be easily forced into the hay; then, by forcing the bar B down with the cam or lock-lever D, the prongs H will be forced outward into the position shown in fig. 1, securely supporting the load upon the fork until the loaded fork has reached the place where it is desired to deposit the hay; then, by raising the lock-lever D, by means of the trip-cord F, the weight of the hay will draw the prongs H down into the position shown in red in fig. 1, allowing the hay to slip from the fork.

The rack-bar B and the bases or inner ends of the prongs H should be so formed that shoulders formed upon the lower part of the bar B, just above the upper rack-teeth, may rest against the upper sides of the inner ends of the prongs H, so as to help support the load, and give additional strength to the fork.

Having thus described my invention, I claim as new, and desire to secure by Letters Patent—

The arrangement of the right-angular lever D, adapted to press at its angle-point upon the projection $b'$ formed upon the central rack-bar B, to spread the tines D, and, upon being raised by the cord F, permitting the hay to discharge itself from the tines H by gravity, as herein shown and described.

E. J. FENN.

Witnesses:
J. W. HATCH,
J. O. POMROY.